March 20, 1956  F. H. MUELLER  2,738,799
ROTARY PLUG VALVE
Filed Oct. 28, 1953  2 Sheets-Sheet 1

INVENTOR
*Frank H. Mueller*

BY *Cushman, Darby & Cushman*
ATTORNEY

March 20, 1956 F. H. MUELLER 2,738,799
ROTARY PLUG VALVE
Filed Oct. 28, 1953 2 Sheets-Sheet 2

INVENTOR
Frank H. Mueller

BY
Cushman, Darby & Cushman
ATTORNEYS

United States Patent Office 2,738,799
Patented Mar. 20, 1956

2,738,799

ROTARY PLUG VALVE

Frank H. Mueller, Decatur, Ill., assignor to Mueller Co., Decatur, Ill., a corporation of Illinois Application October 28, 1953, Serial No. 388,815

7 Claims. (Cl. 137—246.22)

This invention relates to rotary plug valves, and more particularly to means for retaining the plug of a tapered rotary plug valve in its seat.

While various means have been devised for retaining the plug or key of a tapered rotary plug valve in its seat, all such means heretofore devised are open to various objections. Plug valves of the type with which this invention is concerned are known in the art as "ground key stops," i. e., wherein the tapered plug or key is ground to its seat for a more effective seal therewith. The engagement between tapered plugs and their seats, however, must be with an optimum force. If the force with which the plug is engaged with its seat is too high, the plug will bind and render opening and closing movements thereof extremely difficult, if not impossible. Additionally, when a tapered plug is forced too tightly into its seat, the opposed sealing surfaces of the plug and seat are distorted to such an extent that port leakage occurs when the valve is closed, i. e., leakage of pressure fluid through the valve.

If the seating force is too low, end leakage occurs, i. e., leakage from the ends of the plug seat.

In order to effect a better seal and also to lessen the forces required to turn the plug, the sealing surfaces of tapered rotary plug valves frequently are lubricated under pressure, which pressure tends to raise or jack the plug slightly from its seat. In such instances, the valve is usually supplied with spring means for constantly urging the plug to seat. Springs heretofore used, however, do not have a constant-load characteristic, i. e., a constant force throughout any appreciable range of spring deflection, and the force increases with increasing spring deflection. Consequently, when a spring-seated tapered plug is jacked from its seat by lubricant pressure, the increased plug-seating force tends to thin and dissipate the lubricant film.

Further, in many instances the force with which a tapered plug is seated is adjustable by a nut or other threaded member bearing against a plug-seating spring. In use, accidental or deliberate turning of the threaded member not only changes the desired optimum force of engagement between the sealing surfaces of the valve, but also affects the lubricant film thereon by changing the plug-seating force.

Accordingly, it is an object of this invention to provide a tapered rotary plug valve with means for urging the plug into engagement with its seat with a substantially constant force throughout a range of axial displacements of the plug between slightly unseated and fully-seated positions.

It is another object of this invention to provide a lubricated tapered rotary plug valve with substantially permanently-locked and non-adjustable means for urging the plug member to seat with a substantially constant optimum force throughout a range of axial displacements of the plug between slightly unseated and fully-seated positions thereof.

It is another object of this invention to provide a tapered rotary plug valve with means for constantly urging the plug member into engagement with its seat with a substantially constant optimum force, irrespective of slight unseating displacements of the plug effected by line or lubricant pressures.

Other objects and advantages of the invention will become apparent from the following description and accompanying drawings, in which.

Figure 1:
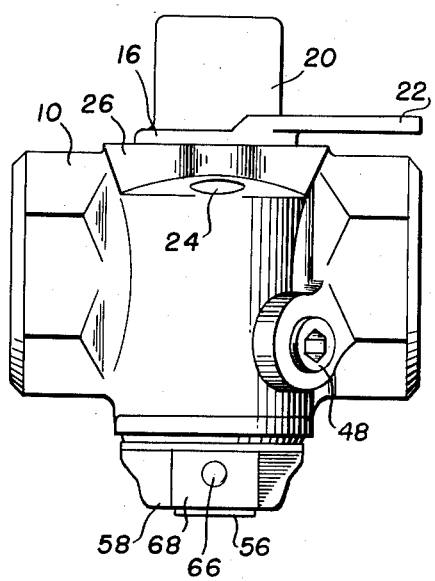
Figure 1 is a front elevational view of a tapered rotary plug valve embodying this invention and with the valve shown in open position.
Figure 2:
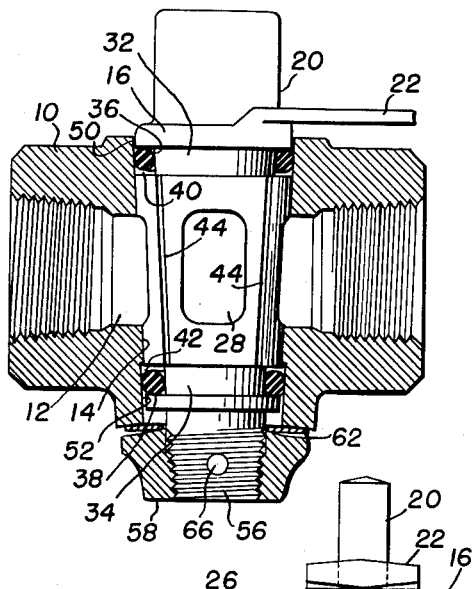
Figure 2 is a vertical sectional view of the valve shown in Figure 1.
Figure 4:
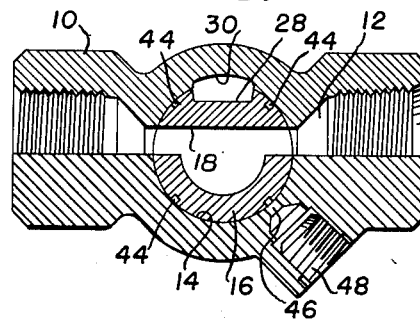
Figure 4 is a horizontal sectional view taken substantially on lines 4—4 of Figure 3.

Referring to Figures 1 to 4 of the drawings, there is shown a ground key stop or tapered rotary plug valve having a casing or body 10 provided with a fluid passageway 12 transversely intersected by a tapered plug seat 14. Both ends of the passageway 12 may be appropriately interiorly threaded, as shown, for connection into a line. Rotatable in the plug seat 14 is a tapered key or plug 16 having a port 18 therethrough that is turnable into and out of registry with the body passageway 12 to open and close the valve. The large end of the plug 16 may be provided with a wrench-engageable extension 20 for rotating the plug in its seat 14 and may also be provided with a lock wing 22 having an aperture (not shown) therethrough alignable with a corresponding aperture 24 in another lock wing on the body for locking the valve in its closed position. Circumferentially spaced approximately 90° from both ends of the plug port 18 are two opposite blind or false ports 28 in the surface of the plug which register with corresponding false or blind recesses or ports 30 in the seat 14 when the valve is in open position.

Each end of the plug 16 is provided, inwardly of the corresponding end of the seat 14, with a circumferential packing grooves 32 and 34, substantially rectangular in radial section. Disposed in the grooves 32 and 34 are corresponding resilient pressure-deformable packing rings 36 and 38, known in the art as "O-rings." In radial section each ring 36 and 38 is, when relaxed, circular, of a diameter sufficient to engage the bottom of its groove and the opposed surface of the seat 14, and somewhat narrower than its groove to leave the slight spaces 40 and 42 between the inner sides of the rings and the inner side walls of their grooves.

Equally circumferentially spaced between both ends of the plug port 18 and the plug false ports 28 are four lubricant channels 44 extending longitudinally in the surface of the plug 16 and connecting the two grooves 32 and 34. One of these channels 44 is aligned with a lubricant charging port 46 in the wall of the body 10 in the open position of the valve (Figure 4), and another channel 44 is so aligned in the closed position of the valve. The outer portion of the charging port 46 is enlarged and interiorly threaded for the reception of a threaded plug 48 which closes the charging port 46 and also can be used to exert pressure on lubricant therewithin. The four lubricant channels 44 together with the spaces 40 and 42 in the grooves 32 and 34 inwardly of the O-rings 36 and 38, form a closed lubricant system into which lubricant may be supplied under pressure via the charging port 46. Preferably, the opposed surfaces of the plug 16 and the seat 14 are spaced apart outwardly beyond the grooves 32 and 34, as by relieving the plug at its large end outwardly of the groove 32, as at 50 (Figure 2), and relieving the seat 14 at its small end from the plug groove 34 outwardly, as at 52. The opposed surfaces of the plug 16 and seat 14 between the two grooves 32 and 34 preferably are ground together for tight sealing engagement therebetween.

The structure and advantages of the valve thus far described are claimed and disclosed more in detail in the patent to Frank H. Mueller, 2,653,791, issued September 29, 1953.

Figure 5:
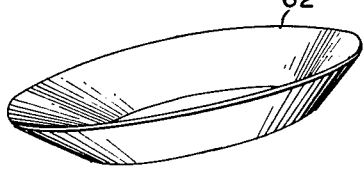
Figure 5 is a perspective view of a Belleville spring.
Figure 7:
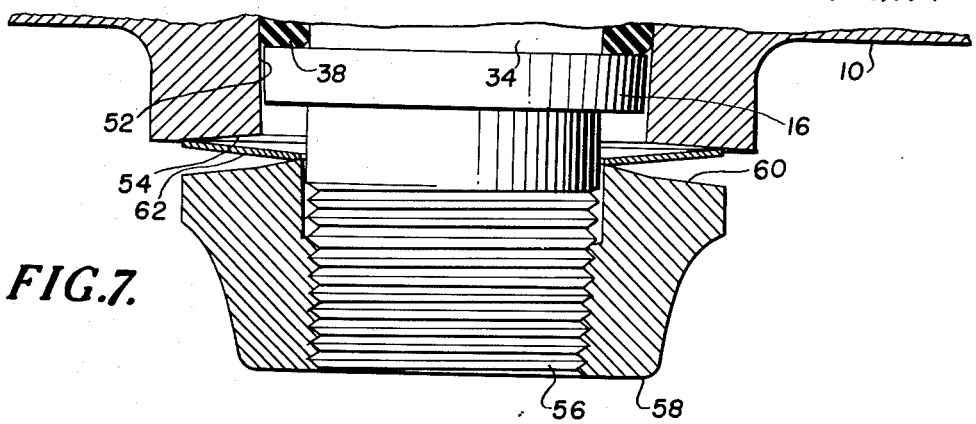
Figure 7 is a view corresponding to Figure 6, but illustrating a partial assembly of the valve shown in the latter figure.
Figure 6:
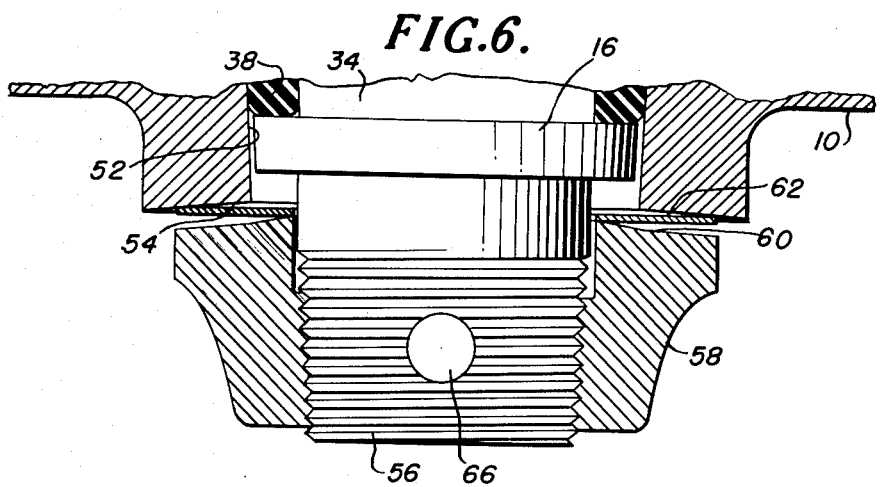
Figure 6 is an enlarged fragmentary view of a portion of Figure 2.

The valve body 10 surrounding the small end of the seat 14 is provided with a circular dished surface 54, i. e., a concave frusto-conical or conoidal surface, shown best in Figures 6 and 7. At its small end the plug 16 is provided with a reduced threaded extension 56 having a nut 58 thereon. The circular surface 60 of the nut 58 opposed to the body surface 54 is substantially complementary to the latter, i. e., of convex generally frusto-conical or conoidal configuration. Engaged between the body and nut surfaces 54 and 60, respectively, is a spring washer 62 that is of substantially frusto-conical configuration when relaxed, as shown in Figure 5, but is compressed between the nut and the body substantially flat, as is best shown in Figure 6, to urge the plug 16 into engagement with its seat 14. As shown in this latter figure, the inner peripheral portion of the washer 62 is engaged only by the inner peripheral portion of the nut surface 60, while the outer peripheral portion of the washer is engaged only by the outer peripheral portion of the body surface 54.

Figure 8:
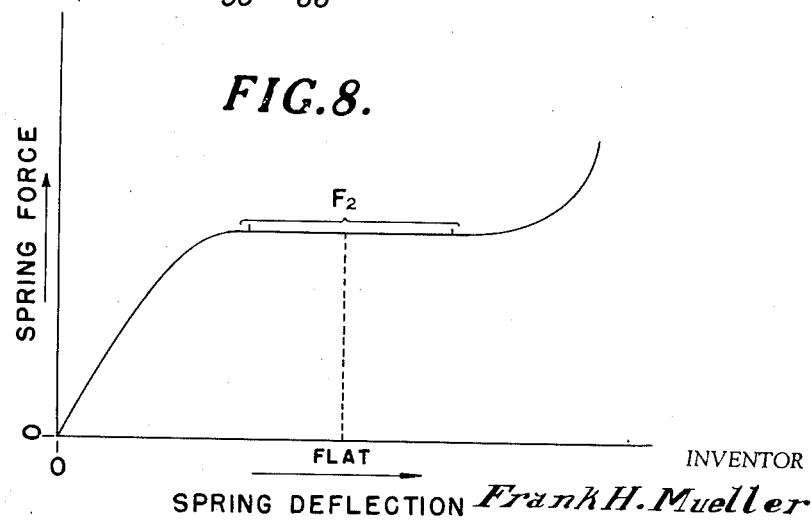
Figure 8 is a graph illustrating the reaction force versus deflection characteristics of a Belleville spring.

Because of the dished configuration of the body surface 54 and the complementary configuration of the nut surface 60, it will be seen that when the washer 62 is substantially flat, as shown in Figure 6, the latter can be coned slightly inwardly to permit the plug 16 to be unseated slightly against the spring force of the washer without deforming the latter beyond its elastic limit. The spring washer 62 is of a particular type known in the art as a "Belleville" spring washer which can be, and in this case is, designed and proportioned to have a reaction force vs. deflection characteristic approximating that shown by the graph in Figure 8. From an inspection of this graph, it will be seen that as the spring 62 is compressed and deflected from its normal relaxed state between opposed surfaces, spring force increases rapidly until the spring is substantially flattened. For an appreciable range of deflection extending on both sides of this flattened state, the force of the spring is substantially constant, as shown by the extent Fc on the curve shown in Figure 8. Continued deflection of the spring through and appreciably beyond a flattened state causes the force of the spring to again abruptly increase, and the elastic limit of the spring will be reached before it reaches a frusto-conical configuration reversed from its relaxed configuration.

In the valve construction illustrated, the spring washer 62 is designed so that in its flattened state it will exert a seating force on the plug 16 which will bring the latter into optimum seating engagement with its seat 14, and in this position of the parts the spring force urging the plug to seat remains substantially constant throughout a range of axial displacements of the plug between slightly unseated and fully-seated positions thereof.

Figure 3:
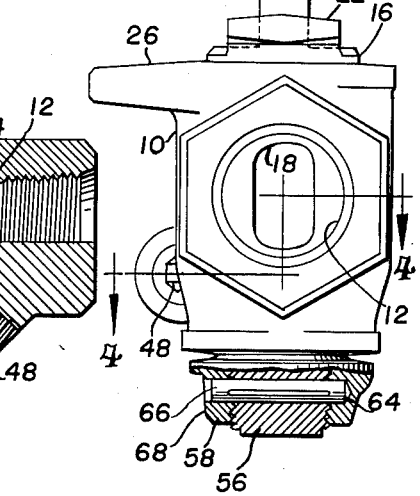
Figure 3 is an end view of the valve shown in Figure 1, with parts being shown in section to illustrate details more clearly.

In assembling the valve, the plug 16 is inserted into its seat 14, the washer 62 is placed in proper position on the plug extension 56, and the nut 58 is threaded thereon to begin to compress the washer, as is shown in Figure 7. The nut 58 is continued to be threaded onto the extension 56 until the washer 62 has been compressed into a substantially flat state, as shown in Figure 6. Thereupon, desirably a hole is drilled through one side of the nut 58, completely through the extension 56, and partially into the other side of the nut, to form a blind socket 64, as shown in Figure 3, and a pin 66, slightly oversized with respect to the drilled hole, is hammered into the aligned holes in the nut and the extension and into the blind socket 64. Thus, the nut 58 is substantially permanently locked on the extension 56. It will be noted that this provides a substantially tamper-proof construction, since the pin 66 cannot be removed except by drilling through the nut 58 into the blind socket 64 and driving out the pin by an appropriate tool. Further, it will be noted that the nut 58 is provided with three substantially equally-spaced cut-outs 68 below its surface 60 and that the intermediate portions of the nut are tapered to preclude ready engagement thereof by any type of wrench normally available in a household for attempts to turn the nut on the extension 56.

Because of the foregoing tamper-proof construction, once the valve has been properly assembled, the seating force of the spring 62 cannot be adjusted or changed by rotating the nut 58 on the extension 56. Nevertheless, if the plug 16 should be difficult to turn for any reason whatever, the plug extension 56 can be tapped on its end with a hammer, to thereby slightly unseat the plug and render it easy to turn. Even though the plug 16 is slightly unseated, however, the spring 62 exerts a constant force to reseat the same. Further, because the plug-seating force is substantially constant throughout a small range of axial movements of the plug 62, the lubricant film on the opposed sealing surfaces of the plug 16 and seat 14 is uniformly maintained to thus increase the life of the valve. Further, it can be seen that no seating force adjustments can be made which will effect the grease film.

As is disclosed more in detail in the aforementioned patent to Frank H. Mueller, the introduction of lubricant under pressure into the aforedescribed lubricant system of the valve deforms the O-rings 36 and 38 into tight engagement with the outer side walls of their grooves 32 and 34 with the opposed surfaces of the plug seat 14. Since the O-rings constantly tend to resume their original circular-in-radial-section shape, the thus-formed O-rings constantly exert a force on the lubricant to maintain pressure thereon, even though some lubricant might be dissipated during opening and closing movements of the valve. Further, it will be seen that, even though lubricant or line pressure slightly unseats the plug 16, the washer 62 exerts a constant seating force which aids the O-rings in maintaining pressure on the lubricant in the system.

It will thus be seen that the objects of this invention have been fully and effectively accomplished. It will be realized, however, that various changes may be made in the embodiment disclosed for the purpose of illustrating the principles of this invention without departing from such principles. Therefore, this invention includes all modifications encompassed by the spirit and scope of the following claims.

I claim:

1. In a rotary plug valve having a body member provided with a fluid passageway intersected by a tapered plug seat and a tapered ported plug member seated and rotatable in the seat, the combination comprising: concentric, opposed, generally axially-facing, oppositely-inclined conoidal surfaces on the members at one end of the seat; and a spring washer, of frusto-conical configuration when relaxed, engaged in substantially line contact with, and compressed substantially flat between, said surfaces for urging the plug member to seat with optimum force, said washer having a substantially constant force vs. deflection characteristic for an appreciable range of deflection extending on both sides of a flat deflected condition, the inclinations of said surfaces being sufficient to permit a range of axial displacements of the plug between fully seated and slightly unseated positions while maintaining substantially line contact between said washer and said surfaces.

2. The structure defined in claim 1 in which the surface facing outwardly of the body member is of concavo configuration.

3. The structure defined in claim 1 in which the surface facing inwardly of the body is formed by an element threadedly engaged with one of the members, and including means substantially locking said element to said one member.

4. The structure defined in claim 1 including an extension on the small end of the plug member, and wherein the surface on the plug member is formed on said extension and the surface on the body member is at the small end of the seat.

5. The structure defined in claim 1 including a threaded extension on the small end of the plug member and a nut threaded onto said extension, and wherein the surface on the plug member is formed by said nut and the surface on the body member is at the small end of the seat.

6. The structure defined in claim 1 including means defining a circumferential packing groove in one of the circular opposed surfaces of the plug member and its seat at one end of the latter, a resilient pressure-deformable packing ring in said groove contacting both the bottom thereof and the other of said surfaces, said ring when relaxed being non-complementary to the outer side wall of said groove, means for supplying lubricant under pressure into said groove at the inner side of said ring, lubricant channel means extending inwardly from said groove between said surfaces, and means for sealing the other end of the seat.

7. The structure defined in claim 1 wherein the surfaces overlap radially, and in conjunction with the washer constitute stop means to confine axial displacements of the plug member within the said deflection range of the washer.

References Cited in the file of this patent

UNITED STATES PATENTS

| | | |
|---|---|---|
| 334,722 | Polle | Jan. 19, 1886 |
| 1,224,959 | Rosenfield | May 8, 1917 |
| 2,615,672 | Hinrichs | Oct. 28, 1952 |
| 2,653,791 | Mueller | Sept. 29, 1953 |